Feb. 26, 1957  A. S. FENEMORE  2,783,399
WINDINGS FOR MAGNETIC STRUCTURES
Filed March 15, 1954

United States Patent Office 2,783,399
Patented Feb. 26, 1957

2,783,399
WINDINGS FOR MAGNETIC STRUCTURES

Alan Stephen Fenemore, Stafford, England, assignor to The English Electric Company Limited, London, England, a British company Application March 15, 1954, Serial No. 416,308

Claims priority, application Great Britain March 20, 1953

10 Claims. (Cl. 310—64)

This invention relates to windings for magnetic structures of the kind in which the conductors of the winding are arranged to extend lengthwise through slots in the magnetic structure, the relative width of the conductors and the slots being such that a substantial clearance exists between the sides of the conductors and the slot walls. Such a winding will hereinafter be referred to as a winding of the kind set forth.

According to the invention, in a winding of the kind set forth, the conductors are uninsulated where they pass through the slots and are spaced from the top and bottom of the slots by spacers formed from a refractory insulating material, the conductors and the spacers being of such a cross-section that, when in position in the slots, they interlock with each other to prevent sideways movement of the conductors in the slots.

The solid insulating spacers may be made, for example, from zircon porcelain, alumina porcelain, silica, or sintered alumina.

According to a further feature of the invention, the conductors of the winding are laminated in depth, each lamination being of such a cross-section that it interlocks with the adjacent laminations to prevent sideways movement of the laminations relative to one another.

Figure 1:
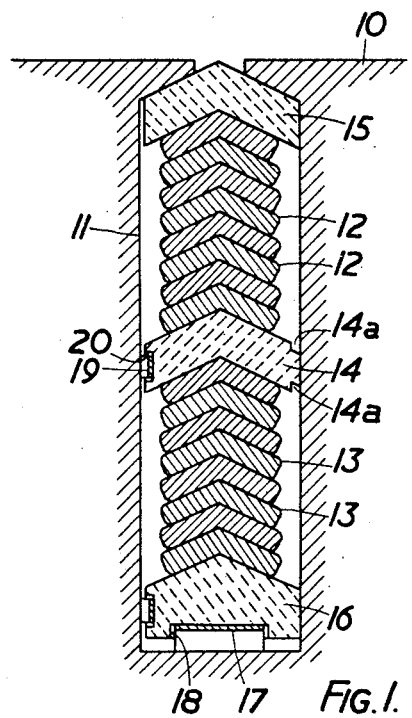
Figure 2:
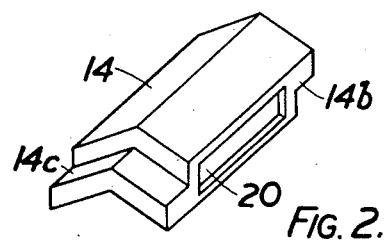

Other features of the invention will appear from the following description with reference to the accompanying drawing where there is shown at Fig. 1 a cross-section through one of the slots of a polyphase electro-magnetic liquid pump and at Fig. 2 one of the solid insulating spacers.

Referring now to the drawing, the laminated magnetic structure of the pump is indicated at 10 and an unlined semi-closed slot is shown at 11. The winding is of the double layer, one turn per slot type, and the conductors are laminated in depth to reduce the eddy current loss.

The conductors are arranged one above the other within the slot, the upper conductor comprising the uninsulated laminations 12, and the lower conductor comprising the uninsulated laminations 13.

The conductor laminations are chevron-shaped in cross-section so that they interlock with one another, and are of such a width that when assembled in the slots a substantial clearance exists on both sides of the laminations between them and the slot walls. The two conductors are separated from each other by solid insulating spacers 14 which are likewise of chevron-shaped cross-section.

The uppermost of the conductor laminations 12 is insulated from the magnetic structure at the top of the slot by further chevron-shaped solid insulating spacers 15, whilst the lowermost of the conductor laminations 13 is insulated from the magnetic structure at the bottom of the slot by solid insulating spacers 16 whose upper surfaces are shaped to fit the underside of the lowermost conductor lamination.

The complete stack of conductor laminations and spacers is urged upwardly within the slot by means of spring strips 17 disposed within recesses 18 formed in the underside of the spacers 16 and acting against the bottom of the slot. The conductor laminations are thus held tightly in compression so that, due to the interlocking of the conductor laminations and solid insulating spacers, sideways movement of the laminations relative to each other is prevented.

Similar but narrower spring strips 19 are fitted into recesses 20 formed in the sides of the spacers 14 and 16 and these hold the spacers against the right hand slot wall, as seen in the drawing, thereby positively locating the conductor and spacer stack in relation to the slot, and so preventing vibration of the conductors.

The spring strips 19 are preferably arranged to urge the spacers 14 and 16 in the direction in which the conductor laminations are urged by the reaction thrust resulting from the useful thrust produced in the air gap of the pump.

To increase the creepage distance along the surface of the spacers 14 between the conductor laminations and the slot walls, the spacers are cut away as shown at 14a. The other spacers 15 and 16 may also be similarly cut away if so desired.

The spacers 14, 15 and 16 are of silica and are conveniently manufactured in short lengths. One of the spacers 14 is shown in Fig. 2 where it will be seen that projections 14b and 14c are provided at its opposite ends for forming lapped joints with the adjacent spacers 14 when assembled in the slots. Alternatively the ends of each spacer may be left plain. A sufficient number of spacers is used in each slot so that they extend throughout the full length of the slot.

By making the spacers 14, 15 and 16 of a refractory insulating material it is possible to run the winding at temperatures ranging up to about 800° C.

Over such a range of temperature considerable differential expansion may occur between the spacers and the magnetic structure and between the spacers and the conductors. Such differential expansion is taken up by the springs 17 and 19 which are themselves made of materials which retain their mechanical properties over the working range of temperature. The springs may, for example, be made from one of the nickel-chromium alloys. In some cases it may be desirable to provide stops at the ends of the slots to retain the spacers in position.

Air or any other insulating gas may be passed along the slots in the clearance spaces between the conductor laminations and the slot walls for the purposes of cooling both the conductors and the magnetic structure.

If desired, liners comprising sheets of a refractory insulating material may be used to line the side walls of the slots, and in this case, the conductor and spacer stack lies between the two liners, the spacers locating the conductors relative to the liners so that clearance spaces are formed between the conductors and the liners.

It will be appreciated that the conductor laminations need not be chevron-shaped in cross-section, but may be of any other interlocking cross-section which prevents sideways movement of the laminations relative to one another when they are assembled one above the other in the slots.

The conductor laminations may also be specially shaped so as to present a greater surface area to the surrounding cooling gaseous medium. In one example of this, the laminations are of chevron-shaped cross-section, but have limbs of unequal length. The adjacent laminations in a stack are then arranged to have their longer limbs extending on alternate sides of the stack.

In the case where open slots are used, the top insulating spacers are provided with projections on either side thereof which fit into corresponding recesses in the slot walls.

The invention may, of course, be applied to windings of more than one turn per slot, in which case insulating spacers are provided between each pair of conductors in the slot.

The invention may also be applied to either A. C. or D. C. windings, and in the latter case the conductors may be either laminated as described, or machined from the solid.

Where laminated conductors are used, the laminations may be insulated from one another, if so desired, by means of thin layers of an insulating material appropriate to the working temperature range of the winding. This material may be, for example, processed mica, or aluminium foil upon which an insulating oxide film has been formed on each face.

What I claim as my invention and desire to secure by Letters Patent is:

1. A winding for a magnetic structure of the kind in which the conductors of the winding are arranged to extend lengthwise through the slots in the magnetic structure, the relative width of the conductors and the slots being such that a substantial clearance exists between the sides of the conductors and the slot walls, wherein the conductors are uninsulated where they pass through the slots, and including spacers formed from a refractory insulating material arranged to space the conductors from the top and bottom of the slots, the conductors and the spacers being of such a cross-section that when in position in the slots they interlock with each other to prevent sideways movement of the conductors in the slots.

2. A winding according to claim 1, wherein the spacers are made of a ceramic material.

3. A winding according to claim 1, wherein the spacers are made of zircon porcelain.

4. A winding according to claim 1, wherein the spacers are made of alumina porcelain.

5. A winding according to claim 1, wherein the spacers are made of silica.

6. A winding according to claim 1, wherein the spacers are made of sintered alumina.

7. A winding according to claim 1, wherein the conductors of the winding are laminated in depth, each lamination being of such a cross-section that it interlocks with the adjacent laminations to prevent sideways movement of the laminations relative to one another.

8. A winding according to claim 7, wherein the conductor laminations are chevron-shaped in cross section.

9. A winding according to claim 1, including spring means located within the slots and arranged to maintain the conductors and the spacers in contact with one another under mechanical pressure.

10. A winding according to claim 1 including spring means located between the spacers and one side of the slots arranged to urge the spacers against the other side of the slots.

References Cited in the file of this patent

FOREIGN PATENTS 3,106   Great Britain _____ of 1912